United States Patent
Tiihonen et al.

(10) Patent No.: US 7,180,868 B1
(45) Date of Patent: Feb. 20, 2007

(54) METHOD AND EQUIPMENT FOR SETTING A TIMER

(75) Inventors: Juha Tiihonen, Espoo (FI); Tommi Parkkari, Helsinki (FI); Jouni Turunen, Kerava (FI); Jorma Peisalo, Vantaa (FI); Mikko Ohvo, Numminen (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/762,721

(22) PCT Filed: Aug. 11, 1999

(86) PCT No.: PCT/FI99/00666

§ 371 (c)(1),
(2), (4) Date: Apr. 26, 2001

(87) PCT Pub. No.: WO00/10358

PCT Pub. Date: Feb. 24, 2000

(30) Foreign Application Priority Data

Aug. 12, 1998 (FI) ...................................... 981738

(51) Int. Cl.
H04L 12/26 (2006.01)
H04J 3/08 (2006.01)
(52) U.S. Cl. ..................... 370/252; 370/331; 370/503
(58) Field of Classification Search ................ 370/252, 370/338, 401, 331, 465, 253, 314, 324, 349, 370/350, 464, 477, 498, 503
See application file for complete search history.

(56) References Cited

U.S. PATENT DOCUMENTS 4,642,806 A 2/1987 Hewitt et al.

(Continued)

FOREIGN PATENT DOCUMENTS

EP 0 877 513 11/1998

(Continued)

OTHER PUBLICATIONS

Siegmund M. Riedl, Matthias K. Weber, Malcolm W. Oliphant, An Introduction to GSM, 1995, Artech House, Section 3.7, pp. 42-45.*

(Continued)

*Primary Examiner*—Andrew C. Lee
(74) *Attorney, Agent, or Firm*—Pillsbury Winthrop Shaw Pittman LLP

(57) ABSTRACT

A method of setting a timer associated with a protocol supporting a data link in a digital mobile communication system in a connection section. At least one party (MSC/IWF, MS) to the connection section monitors if the need to change the timer value has arisen. Should such a need be detected, the timer value (S) is set to a value deviating from the initial value. The need to change the timer value (S) is also determined during the connection, such as in handover, for example by measuring the propagation delay associated with the connection section. This may be implemented by either of the parties to the connection transmitting to the other party a frame (F) which is selected/formed such that the party receiving the frame sends an acknowledgement (Ack) to the transmitting party. The party which transmitted the frame measures the time from the moment of transmission of the frame (F) to the arrival of the acknowledgement (Ack) and deduces the propagation delay (D) therefrom.

12 Claims, 1 Drawing Sheet

U.S. PATENT DOCUMENTS

| | | | |
|---|---|---|---|
| 5,444,766 A * | 8/1995 | Farwell et al. | 455/437 |
| 5,613,205 A * | 3/1997 | Dufour | 455/440 |
| 5,664,091 A | 9/1997 | Keen | |
| 5,742,588 A * | 4/1998 | Thornberg et al. | 370/236 |
| 5,793,744 A | 8/1998 | Kanerva et al. | |
| 6,021,124 A * | 2/2000 | Haartsen | 370/336 |
| 6,073,020 A * | 6/2000 | Andresen | 455/436 |
| 6,076,114 A * | 6/2000 | Wesley | 709/235 |
| 6,205,157 B1 * | 3/2001 | Galyas et al. | 370/503 |
| 6,289,482 B1 * | 9/2001 | Joshi et al. | 714/748 |
| 6,298,048 B1 * | 10/2001 | Lamkin et al. | 370/324 |
| 6,463,044 B1 * | 10/2002 | Seo | 370/329 |
| 6,868,270 B2 * | 3/2005 | Dent | 455/435.1 |

FOREIGN PATENT DOCUMENTS

| | | |
|---|---|---|
| WO | WO 96/05709 | 2/1996 |
| WO | WO 97/04611 | 2/1997 |
| WO | WO 97/20407 | 6/1997 |

OTHER PUBLICATIONS

GSM Technical Specification, GSM 04.22, v 5.0.0, Dec. 1995, pp. 9-19, Chapter 3; Table 1; section 5.4.3.

* cited by examiner

METHOD AND EQUIPMENT FOR SETTING A TIMER

This application is the national phase of international application PCT/FI99/00666 filed Aug. 11, 1999 which designated the U.S.

BACKGROUND OF THE INVENTION

The invention relates to considering the propagation delay on a data link in a digital mobile communication system. The invention will be described using primarily the terms of the GSM system, but it can also be applied to other kind of digital mobile communication systems.

In a data call in a digital mobile communication system, the propagation delay is one of the parameters affecting connection quality. The extent of the propagation delay should affect the choice of system parameters. One such system parameter is the set value of a timer T1 associated with the GSM system RLP protocol (Radio Link Protocol). The timer is defined in the ETSI recommendation GSM 04.22.

Knowing the value of the propagation delay would contribute to the optimization of the timers of protocol software, particularly those of its layer 2. Connection-specific optimization of timer settings improves the reaction speed of protocol software for example in error situations when the integrity of user data has to be fixed by retransmission of either part or all of the frames in a transmission window. (A transmission window is the number of RPL frames the transmitting party can send without receiving acknowledgement from the receiving party.) If the timer is set too long, data transmission slows down, since potential errors are not corrected until the timer has expired. Setting the timer too short, again, results in a much more serious situation, since the transmitting party has to continuously request acknowledgements from the receiving party.

The problem is particularly perceivable when a connection includes a portion which causes much propagation delay, a satellite link, for example. In this case data calls may not succeed or the data transfer rate decreases significantly.

Still more significant variations in the propagation delay may occur in inter-BTS handover to a cell whose connection to the mobile switching centre is implemented via a satellite link. Such a situation is shown in FIG. 1, in which the mobile station MS moves along route 1 denoted by a broken line in such a way that the connection is initiated via a base station subsystem BSS1 which has a normal wired connection to the mobile switching centre, or, in short, to the centre, MSC. During the call, inter-BTS handover occurs to a base station system BSS2 whose connection to the centre MSC is via a satellite SAT.

BRIEF DESCRIPTION OF THE INVENTION

The object of the invention is thus to provide a method and an equipment for implementing the method to solve the above problems associated with variation in the propagation delay. The objects of the invention are achieved by a method and a system which are characterized by what is disclosed in the independent claims. The different embodiments of the invention and the preferred variations thereof are disclosed in the dependent claims.

An option would be to improve the tolerance of the system to variations in the propagation delay, for example by increasing the size of the transmission window. However, this would cause the problem of increased data to be retransmitted in error situations.

To define a default or initial value for the timer and to have at least one party monitor if the need has arisen to change the timer value, is considered as a better solution. Should such a need be detected, the timer value is set to differ from the default or initial value.

The need to change the timer value can be determined in handover, particularly when network structure changes, for example when inter-BTS handover takes place to a cell whose base station is connected to the mobile centre via a satellite link. Instead or in addition, it is also preferable to repeatedly determine the need to change the timer value during the connection. Alternatively or in addition, the need to change the timer value can be detected by an explicit notice, for example by maintaining a table containing cell, location area or base station controller-specific optimum values for the timer.

In known mobile communication systems, setting the timer value is based on network planning, i.e. the timer value has to be set as low as possible, but nonetheless definitely higher than the highest existent propagation delay value. The improvement brought about by the invention is that the system operates without such a security margin, thus improving the transfer rate in the system. The invention also allows the use of transmission methods having propagation delays that differ from normal at such interfaces as the A interface between a mobile centre MSC and a base station system BSS.

PRIMARY EMBODIMENT

The primary embodiment of the invention is a solution in which setting the timer value comprises measuring the propagation delay associated with a connection section. A connection refers to an entire end-to-end connection between subscriber A and subscriber B (and/or subscriber C . . . ). A connection section refers to that section of the connection which has a separate protocol timer. A typical connection section forms between a mobile switching centre MSC and a mobile station MS.

Measuring the propagation delay is not a simple solution, since, unlike in athletic contests, there is no external observer to start the run and stop the timer as the runner breasts the finishing tape. An option is for the transmitting party to transmit to the receiving party a frame selected and/or formed in a such a way that the receiving party sends an acknowledgement thereof. In FIG. 1, the frame and the acknowledgement are denoted by references F and Ack, respectively. In the example of FIG. 1, the mobile switching centre MSC transmits frame F and the mobile station MS, while within the area of the base station system BSS2, sends acknowledgement Ack. The transmitting party measures the time that passes from the moment frame F is transmitted to the arrival of acknowledgement Ack. However, this is not necessarily exactly the same as the propagation delay used to set the timer, unless frames formed from user data are used in the measurement. Such frames are not always available, particularly when most needed, i.e. when the connection is being set up and the timer should be set to a suitable value. Hereinafter, frames formed from user data are called 'payload frames' and the frame used for measuring the propagation delay is called 'a measurement frame'. If a measurement frame is not a payload frame, it is called 'a separate measurement frame'. Such separate measurement frames may be treated differently at the other end of the connection than payload frames, i.e. they may have a different priority and/or processing time, i.e. the measurement result it not necessarily representative.

User data is sent in I+S frames (Information+Supervisor frame). The use of such frames for measuring the propagation delay is most preferable when there is user data to be sent, since they do not cause extra load to the network. They do not either cause the problem that frames used for measuring are treated differently at the receiving end than payload frames. As regards I+S frames, it should be noted that one acknowledgement can cover several frames. If several successive I+S frames are transmitted, the acknowledgement of the last one also acknowledges all previous frames. Hence the acknowledgement number may shows skips. In this case, a to-and-fro propagation delay is the time between frame F and acknowledgement Ack that have the same number.

I+S frames cannot always be used. They are available only in a data transmission mode when there is user data to be transmitted. In this case, a Test frame, for example, can be used in the GSM RLP, resulting in a reliable measurement result without any risk of collision since the receiving party has to acknowledge each Test frame separately, i.e. transmit a corresponding Test Response frame. The use of the information field in a Test frame allows measurement frames to be numbered and thus the Test Response frame can be used for identifying which measurement frame each acknowledgement is associated with. The problem in a Test frame, as in all separate measurement frames, is that the transmission and acknowledgement of extra frames adds to the network load and may slow down data transmission. On the other hand, the moment for using separate measurement frames is when there is no user data to be transmitted. Another problem in a Test frame is that the receiving party processes it in a different way than payload frames, i.e. each Test frame is separately acknowledged, whereby the measurement result may be better than the actual propagation delay experienced by the payload frames. As was stated above, particularly a situation where the timer setting is lower than the actual propagation delay is to be avoided.

Another potential measurement frame is the RLP protocol SABM (Set Asynchronous Balanced Mode) which the receiving party acknowledges by frame UA (Unnumbered Acknowledgement). A mobile station can utilize this frame type efficiently since it usually starts the set-up of a connection section. No extra frames have to be used in the measurement, since an SABM frame is anyway required after the connection section has been set up. A problem is that if the interworking function IWF of the mobile switching centre MSC uses the same pair of frames, this results in double initialization of a connection section, since the mobile station is likely to have set up the connection section. Another problem is that in an RLP 4 mode according to the ETSI GSM recommendation 4.22, user data may be lost since data buffers are emptied in re-establishment of a connection section.

A third potential measurement frame is the XID frame which is usually employed in a negotiation associated with connection section set-up. It can be used any time and its use does not affect data transmission. A problem is, however, that in XID frame collision, the measurement has to be repeated.

A fourth potential measurement frame is the S frame (supervisor frame). It can be used only in data transmission mode and the use of S frames may slow down data transmission. On the other hand, S frames (unlike I+S frames) can be used even when there is no user data to be transmitted.

SECONDARY EMBODIMENT

A secondary embodiment of the invention is a solution in which the start of a connection and/or a change in network structure, such as in inter-BTS handover, is explicitly informed to the protocol layer that sets the timers. If at the start of a call the connection BSC/MSC is a conventional land connection, the MSC/IWF timers are initiated to one second, for example. If again the connection BSC/MSC is implemented via a satellite, the timers are initiated to higher value, for example 2 seconds. The same deduction is made when the network structure changes, such as in inter-BTS handover. However, this requires major changes in the present GSM system and is feasible mainly in future systems or as a proprietary expansion of present systems.

A way to implement this is via a separate satellite connection indicator. When setting up a connection section (at the start of a call or in handover), the MSC receives information stating that a new connection section is being set up via a satellite, whereby the MSC call control software initiates the IWF protocol software in a corresponding manner. In this case, the satellite connection indicator is mainly an on/off indicator merely indicating that the propagation delay is longer than usual.

Another way is for the MSC call control software to identify delay requirements in call set-up and/or handover on the basis of the route used on the connection section and to notify to the IWF protocol software the special requirements of the route used as regards the tolerance to propagation delay. This method enables the use of several different delay requirement classes, i.e. the tolerance to the propagation delay may be set connection-specifically.

A third way is to identify the delay requirement on the basis of the location area identity, or the like, of the mobile station. In this case the mobile centre must comprise or have access to a table in which the propagation delay is defined cell or location area-specifically.

The embodiments may also be used together in such a way that the initial timer value is determined on the basis of connection type and/or location area on the basis of the secondary embodiment, but the timer value is adjusted later during the connection on the basis of the primary embodiment.

BRIEF DESCRIPTION OF THE DRAWINGS

The invention will be described in greater detail in connection with preferred embodiments with reference to the attached drawings, of which

DETAILED DESCRIPTION OF THE INVENTION

Figure 2:
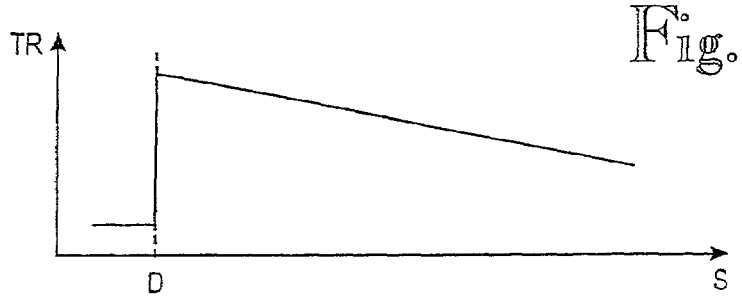
FIG. 2 shows the effect of timer setting on channel transfer rate.

FIG. 2 is a diagram showing the effect of timer setting S on the transfer rate TR of the channel involved. The transfer rate TR is at its highest when the timer setting S corresponds to the actual propagation delay D. If the timer setting S is higher than the propagation delay D, the damage is not that significant, since problems arise only when information on error situations is received only after the timer has expired. If again the timer setting S is lower than the actual propagation delay D, the situation is very bad since the transmission of each frame causes the timer to trigger off, and the transmitting party has to retransmit the frames and/or request for a new acknowledgement. In FIG. 2 the assumption is that in such an error situation the value of the timer is increased. In a prior art system in which the timer setting is fixed, the transfer rate would immediately fall to zero in such a situation, since no acknowledgement is received for retransmitted frames before the timer has triggered off. Finally the connection would break up as a result of an alarm caused by a timer which counts renewed attempts.

Figure 3:
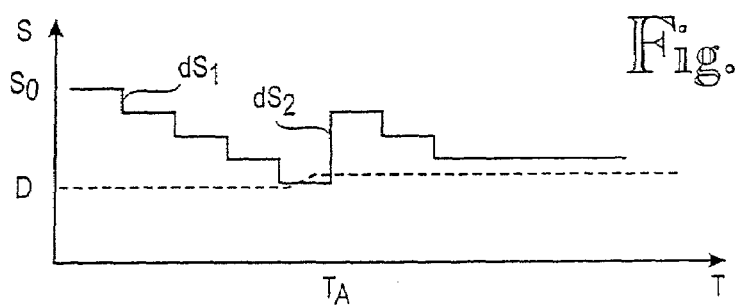
FIG. 3 illustrates adjustment of timer setting.

Timer setting during a connection is preferably implemented by the method shown in FIG. 3. At the start of a connection, the timer is set to an empirical value $S_0$, which definitely is sufficient. The propagation delay is then measured repeatedly during the connection, and the timer value is decreased by step $dS_1$ if the propagation delay D is lower than the timer value S. At time $T_A$ it is observed that the timer value S is lower than the propagation delay D. This could result from a measurement error, random variation or the load on the second party to the connection having increased to the extent that its processing time has increased. Such a situation can be detected either by measuring the propagation delay or by detecting that the number of retransmissions is rapidly increasing. The timer value S is now increased by step $dS_2$, which is substantially higher than the difference between the measured propagation delay D and the current timer value S. In this context "substantially higher" means that the timer setting is increased to a value which is definitely higher than the propagation delay D. Thereupon, when it is observed that the timer value can be decreased, it is again decreased by step $dS_1$, which is clearly lower than the difference between the measured propagation delay D and the current timer setting S.

Figure 1:
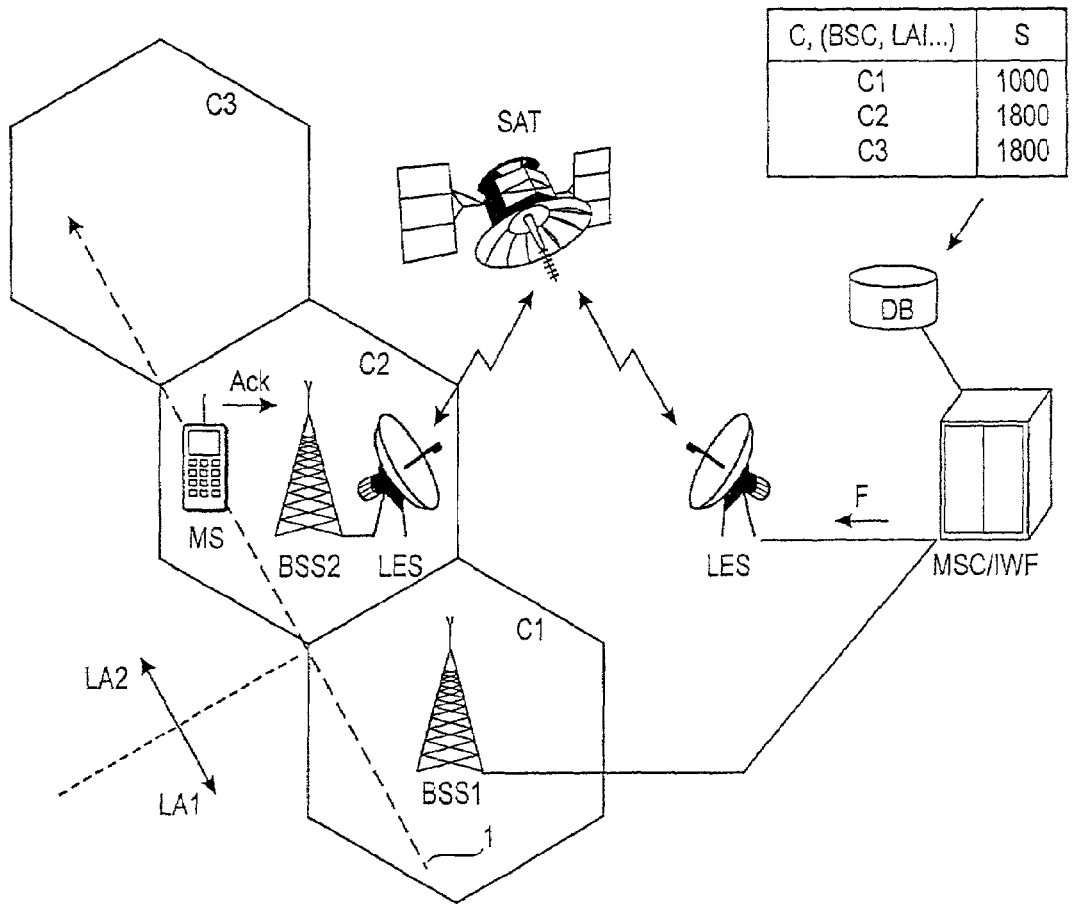
FIG. 1 shows the parts of a digital mobile communication system that are essential to understanding the invention.

FIG. 1 shows a data base, or table DB, which is one way to implement the secondary embodiment of the invention. FIG. 1 shows three cells C1 to C3, of which C1 belongs to location area LA1 and C2 and C3 to location area LA2. The database DB may contain a suitable cell, location area and/or base station controller-specific timer value S (in milliseconds in this case).

The invention can be best implemented in a mobile station MS and a mobile switching centre MSC. In the case of a mobile switching centre, it is preferable to implement the function of the invention also in what are known as anchor centre connections. An anchor centre is the MSC in which the call interworking function IWF is located when a call has moved to the control of another centre as a result of inter-MSC handover.

The invention has been described using the terms of the GSM system, but it is also applicable in other systems, such as the GSM evolution, UMTS, etc. Accordingly, the invention and its embodiments are not restricted to the above examples but may vary within the scope of the claims.

The invention claimed is:

1. A method of setting a timer associated with a protocol supporting a data link in a digital mobile communication system in a connection section comprising a transmitting party and a receiving party, in which method an initial value has been defined for the timer, the method comprising:
at least one of the parties monitoring if a need to change the timer value has arisen; and
setting the timer value to a value deviating from the initial value, should such a need be detected;
wherein said need to change the timer value is determined repeatedly during a connection, in response to a handover.

2. A method as claimed in claim 1, characterized by said setting of the timer value comprising a measurement of a propagation delay associated with the connection section.

3. A method as claimed in claim 2, characterized in that, should a need to decrease the timer value be detected, the timer value is decreased by a first step which is lower than the difference between the measured propagation delay and the current timer value.

4. A method as claimed in claim 2, characterized in that, should a need to increase the timer value be detected, the timer value is increased by a second step which is higher than the difference between the measured propagation delay and the current timer value.

5. A method as claimed in claim 2, characterized by said measurement of the propagation delay comprising the steps of:
either party to the connection transmitting to the other party a frame which is selected/formed such that the party receiving the frame sends an acknowledgement to the transmitting party; and
the party which transmitted the frame measuring the time from the moment of transmission of the frame to the arrival of the acknowledgement and deducing the propagation delay therefrom.

6. A method of setting a timer associated with a protocol supporting a data link in a digital mobile communication system in a connection section comprising a transmitting party and a receiving party, in which method an initial value has been defined for the timer, the method comprising at least one of the parties monitoring if a need to change the timer value has arisen; and
setting the timer value to a value deviating from the initial value, should such a need be detected,
wherein said need to change the timer value is detected from a separate parameter which is read from a database or received from the other party to the connection section at the start of the connection and/or when connection quality changes, such as in handover.

7. A method as claimed in claim 6, wherein said parameter indicating if the connection section is set up via a satellite or not.

8. A method of setting a timer associated with a protocol supporting a data link in a digital mobile communication system in a connection section comprising a transmitting party and a receiving party, in which method an initial value has been defined for the timer, the method comprising:
at least one of the parties monitoring if a need to change the timer value has arisen; and
setting the timer value to a value deviating from the initial value, should such a need be detected,
wherein said need to change the timer value being detected on the basis of the location of the mobile station.

9. An equipment for setting a timer associated with a protocol supporting a data link in a digital mobile communication system in a connection section, the connection section having both a first party and a second party, the first party being said equipment, the equipment being adapted to set a predetermined initial value to the timer, the equipment comprising:
at least one party being adapted to monitor if the need to change the current timer value has arisen; and the equipment being adapted to set the current timer value to a value deviating from the initial value, should such a need be detected, repeatedly during a connection, in response to a handover.

10. An equipment as claimed in claim 9, wherein the equipment is a mobile switching centre.

11. An equipment for setting a timer associated with a protocol supporting a data link in a digital mobile communication system in a connection section, the connection section having both a first party and a second party, the first party being said equipment, the equipment being adapted to set a predetermined initial value to the timer, the equipment comprising:

at least one party being adapted to monitor if a need to change the current timer value has arisen; and the equipment being adapted to set the current timer value to a value deviating from the initial value, should such a need be detected, the equipment further comprising or having associated with it a data base comprising a plurality of different cell, location area and/or base station controller-specific timer values.

12. An equipment as claimed in claim 9, wherein the equipment is a mobile station.

* * * * *